United States Patent
Warden et al.

(10) Patent No.: US 6,674,946 B2
(45) Date of Patent: Jan. 6, 2004

(54) OPTICAL CABLE INCLUDING OPTICAL FIBERS STRANDED WITH HIGH TENSILE STRENGTH FIBERS

(75) Inventors: Gert Warden, Mönchengladbach (DE); Hildegrad Mertens, Mönchengladbach (DE)

(73) Assignee: Nexans, Paris (FR)

( * ) Notice: Subject to any disclaimer, the term of this patent is extended or adjusted under 35 U.S.C. 154(b) by 310 days.

(21) Appl. No.: 09/855,697

(22) Filed: May 16, 2001

(65) Prior Publication Data

US 2002/0003935 A1 Jan. 10, 2002

(30) Foreign Application Priority Data

May 16, 2000 (EP) .............................. 00401342

(51) Int. Cl.$^7$ ................................. G02B 6/44
(52) U.S. Cl. ...................................... 385/104
(58) Field of Search ................ 385/104, 113, 385/103, 107

(56) References Cited

U.S. PATENT DOCUMENTS

| | | | | |
|---|---|---|---|---|
| 4,392,714 A | * | 7/1983 | Bruggendieck et al. | 385/101 |
| 4,844,575 A | * | 7/1989 | Kinard et al. | 385/113 |
| 6,014,487 A | * | 1/2000 | Field et al. | 385/110 |
| 6,249,628 B1 | * | 6/2001 | Rutterman et al. | 385/106 |
| 6,249,629 B1 | * | 6/2001 | Bringuier | 385/113 |
| 6,374,023 B1 | * | 4/2002 | Parris | 385/109 |
| 6,415,084 B1 | * | 7/2002 | Iwasaki | 385/101 |

FOREIGN PATENT DOCUMENTS

| | | | | |
|---|---|---|---|---|
| CH | 622124 A5 | * | 9/1981 | H01B/9/00 |
| DE | 43 36 643 A1 | | 4/1995 | |

* cited by examiner

*Primary Examiner*—Chandrika Prasad
(74) *Attorney, Agent, or Firm*—Sughrue Mion, PLLC

(57) ABSTRACT

An optical cable (1) has at least two optical fibers (2, 3), composed of plastic, which are surrounded by a common sheath (6) made of insulating material. To ensure functional endurance, even with frequent bending, the optical fibers (2, 3) are stranded together with a short length of lay which is smaller than six times the diameter (D) of an optical fiber (2, 3). In addition, at least two layers of high tensile strength fibers (5) composed of insulating material are stranded around the optical fibers (2, 3), which are stranded together.

6 Claims, 1 Drawing Sheet

OPTICAL CABLE INCLUDING OPTICAL FIBERS STRANDED WITH HIGH TENSILE STRENGTH FIBERS

This application is based on and claims the benefit of European Patent Application No. 00401342.1 filed May 16, 2000, which is incorporated by reference herein

BACKGROUND OF THE INVENTION

The invention concerns an optical cable having at least two optical fibers, composed of plastic, which are surrounded by a common sheath made of insulating material, e.g., as described in published German application DE 43 36 643 A1.

Optical fibers—referred to in the following as OF—made of glass or plastic are used more and more in communication technology in place of metallic conductors for the transmission of signals. OF composed of glass are overwhelmingly used for longer transmission paths of, for example, more than 2 kilometers. OF composed of plastic are particularly suitable for shorter transmission paths. Polymers, for example, such as polymethylmethacrylate or polycarbonate, are used as materials for these OF. Both types of OF are mechanically sensitive. They must particularly be protected against radially acting forces and against bending around radii which are too small.

An optical cable is described in DE 43 36 643 A1, mentioned above, with two OF composed of plastic which are positioned in a protective sheath. The protective sheath comprises a metal band formed into a tube and a polymer sheath layer applied externally to the tube. The OF are thus to be protected against moisture and aggressive media, as well as high temperatures. If such a cable is, for example, bent and repeatedly stretched as a flexible cable in a drag chain, the OF can quickly become no longer usable for signal transmission.

SUMMARY OF THE INVENTION

It is an object of the invention to make the optical cable described above in such a way that its functionality is retained even with frequent bending and stretching.

This object is achieved according to the invention in that,
the OF are stranded together with a short length of lay, which is smaller than six times diameter of an OF,
at least two layers of high tensile strength fibers composed of insulating material are stranded around the OF, which are stranded together, and
the sheath is located over the high tensile strength fibers.

Merely the short length of lay with which the OF are stranded together makes the optical cable as a whole very bendable and stretchable multiple times, with the transmission properties of the OF remaining nearly unchanged for a long time. Through the additional application of at least two stranded layers of high tensile strength fibers over the OF, which are stranded together, overall an optical cable with OF composed of plastic is made which indefinitely retains its transmission properties without restrictions, even if it is constantly alternately bent and stretched, for example during use in a drag chain.

Advantageous developments of the invention will be clear from the detailed description and claims below.

BRIEF DESCRIPTION OF THE DRAWINGS

Examples of the invention are depicted in the drawings, in which.

DETAILED DESCRIPTION OF THE INVENTION

Figure 1:
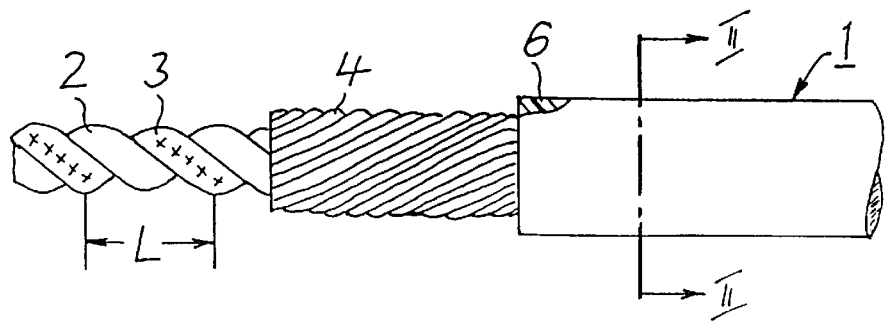
FIG. 1 is a side view of a cable according to the invention, depicted schematically with partially removed layers.
Figure 2:
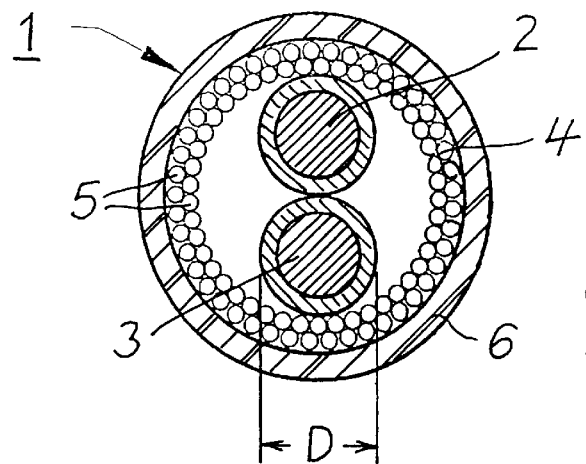
FIG. 2 is an enlarged depiction of a section along line II—II in FIG. 1.
Figure 3:
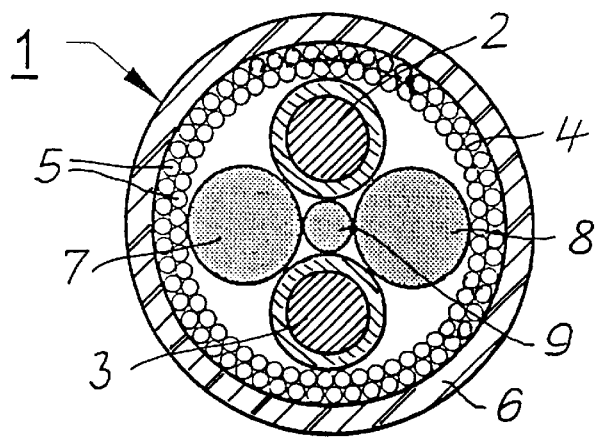
FIG. 3 is a section through an embodiment of the cable with the two fibers stranded together with plastic cords.

The optical cable 1 illustrated in FIGS. 1 to 3 has two OF 2 and 3 composed of plastic which are stranded together. A short length of lay L is provided for the stranding, which is smaller than six times the diameter D of an OF 2 and 3, provided with a protective lamination, visible in FIGS. 2 and 3. The length of lay L is then the length which the respective OF has to travel to lie in the same position, seen in the direction of the circumference of the stranded composite. A lamination 4 is applied around the OF 2 and 3 which, corresponding to FIGS. 2 and 3, is assembled from two layers of high tensile strength fibers 5 composed of plastic which are stranded around the OF 2 and 3. The fibers 5 are made of, e.g., aramid. The direction of lay of the stranding is the same in both layers composed of fibers 5. The lamination 4 comprises at least two layers with fibers 5. There can also be more layers.

A sheath 6 made of plastic, for example polyvinyl chloride, is positioned over the lamination 4. It is, for example, applied by extrusion onto the fibers 5 of the lamination 4. The two layers surround the OF 2 and 3 so tightly that the material of the sheath 6 cannot penetrate them. The mobility of the OF 2 and 3 inside the lamination 4 is thus not hampered.

If only two OF 2 and 3 are present in the cable 1, corresponding to the embodiment depicted, then, for practical purposes, they are stranded together with two cords 7 and 8 made of plastic which have the same diameter D as the OF 2 and 3. The cords 7 and 8 are made of, e.g., polypropylene. An approximately circular cross-section thereby results overall for the cable 1, as is shown in FIG. 3. For a cable 1 with three OF, only one such cord would be necessary for a circular cross-section. For more than three OF, no cord would, in principle, be required.

For further improvement of the bending behavior of the cable 1, the OF 2 and 3 could be stranded together with the cords 7 and 8 around a central core 9 made of plastic. The core 9 could, for example, consist of polypropylene. It can also be implemented with high tensile strength.

What is claimed is:

1. An optical cable having at least two optical fibers composed of plastic, which are surrounded by a common sheath made of insulating material, wherein:
   the optical fibers are stranded together with a short length of lay which is smaller than six times the diameter of one of said optical fibers,
   the optical fibers are stranded together and at least two layers of high tensile strength fibers composed of insulating material are stranded around the optical fibers, and
   the sheath is located over the high tensile strength fibers.

2. A cable according to claim 1, wherein said high tensile strength fibers comprise aramid fibers.

3. A cable according to claim 1, wherein said high tensile strength fibers are stranded in different layers with the same direction of lay.

4. A cable according to claim 1, wherein the optical fibers are stranded together with at least one cord made of plastic whose diameter substantially corresponds to the diameter of the optical fibers, to thereby achieve an approximately circular cross-section of the cable.

5. A cable according to claim 1, wherein the optical fibers and cords are stranded around a central core made of plastic.

6. A cable according to claim 5, wherein the central core has a high tensile strength.

* * * * *